(12) United States Patent
Martinez (10) Patent No.: US 12,007,722 B2
(45) Date of Patent: Jun. 11, 2024

(54) WATCH FOR CALCULATING PHOTOGRAPHIC EXPOSURES

(71) Applicant: Juan Carlos Martinez, San Diego, CA (US)

(72) Inventor: Juan Carlos Martinez, San Diego, CA (US)

(*) Notice: Subject to any disclaimer, the term of this patent is extended or adjusted under 35 U.S.C. 154(b) by 0 days.

(21) Appl. No.: 18/483,523

(22) Filed: Oct. 10, 2023

(65) Prior Publication Data

US 2024/0126210 A1 Apr. 18, 2024

Related U.S. Application Data

(60) Provisional application No. 63/379,623, filed on Oct. 14, 2022.

(51) Int. Cl.
| | |
|---|---|
| *G04B 47/00* | (2006.01) |
| *G03B 7/08* | (2021.01) |
| *G04B 19/18* | (2006.01) |
| *G04G 99/00* | (2010.01) |

(52) U.S. Cl.
CPC ............. *G04B 47/003* (2013.01); *G03B 7/08* (2013.01); *G04B 19/18* (2013.01); *G04G 99/006* (2013.01)

(58) Field of Classification Search
CPC ...... G04B 47/00; G04B 47/003; G04B 19/18; G04G 99/006; G03B 7/08
See application file for complete search history.

(56) References Cited

U.S. PATENT DOCUMENTS

| | | | | |
|---|---|---|---|---|
| 6,359,837 B1 * | 3/2002 | Tsukamoto | ........ | H04N 1/00127 396/318 |
| 11,669,047 B2 * | 6/2023 | Favre | ..................... | G04B 3/006 368/187 |
| 2016/0065831 A1 * | 3/2016 | Howard | ................. | H04N 23/66 348/211.2 |

* cited by examiner

*Primary Examiner* — Edwin A. Leon
*Assistant Examiner* — Jason M Collins
(74) *Attorney, Agent, or Firm* — Timothy L Smith (57) ABSTRACT

The invention provides a wearable device, such as a watch, that provides a way to calculate an appropriate camera shutter speed and aperture setting for a given ISO speed setting to obtain settings that, when entered into a camera, will result in an appropriate photographic exposure. The devices of the invention provide a simple, fast, convenient way to calculate appropriate settings for the components of the photographic exposure triangle.

18 Claims, 3 Drawing Sheets

WATCH FOR CALCULATING PHOTOGRAPHIC EXPOSURES

CROSS REFERENCE TO RELATED APPLICATIONS

This application claims the benefit of U.S. Provisional Application No. 63/379,623, filed Oct. 14, 2022.

BACKGROUND OF THE INVENTION

1. Field of the Invention

The invention relates generally to a wearable device, such as a watch, that provides a fast and simple way to calculate an appropriate camera shutter speed and aperture setting for a given ISO speed setting to obtain settings that, when entered into a camera, will result in an appropriate photographic exposure.

2. Description of the Related Art

The relationship between ISO speed, aperture, and shutter speed, known as the "exposure triangle," is the basis of the photography world. Exposure is a critical element that determines what is actually recorded on a camera's film or other image sensor (e.g., an electronic sensor).

Cameras typically provide adjustable settings for each of the three components of the exposure triangle. The ISO speed setting (commonly known as the "ISO speed" setting, where ISO refers to the International Standards Organization, which standardizes sensitivity ratings for camera sensors), controls how sensitive the camera's sensor is to light. Typically, each value represents a "stop" of light, and each incremental ISO speed represents a doubling or halving of the sensor's sensitivity to light. For example, at an ISO speed setting of 100, the camera sensor has half the sensitivity as when the camera is set at an ISO setting of 200. The lower the ISO speed setting, the less sensitive the image sensor is, and therefore the smoother the image because there is less noise in the image.

The "aperture" of a camera lens refers to the size of the opening in a diaphragm of a camera lens that determines the amount of focused light that passes through the lens. Aperture settings are typically set as "f-stop" numbers. At a small f-stop, such as f/2, the opening is relatively large, letting a large amount of light to pass through the opening even in a small fraction of a second. A larger f-stop setting, f/22, for example, makes the opening much smaller, letting less light pass through the lens in a period of time. A larger aperture (i.e., smaller f-stop) typically results in a shallower depth of focus than a smaller aperture (i.e., larger f-stop). Aperture settings are generally calibrated so that the same amount of light passes through a 35 mm focal length and a 100 mm focal length lens when the two lenses are set at the same shutter speed (e.g., 1/125 second).

The third component of the "exposure triangle" is the shutter speed, which determines how long light passes through the lens and hits the image sensor or film plane. Shutter speeds are typically measured in fractions of a second, and are often displayed on a camera as a reciprocal of the time that the shutter is open (e.g., a shutter speed of "125" generally signifies that the shutter is open for 1/125 second during each exposure). Adjusting the shutter speed can, for example, change how an object in motion is captured in a photographic image. If the shutter speed is faster than the object or background is moving, the image will be sharp. But if the shutter speed is slower than the movement of the object or background, the object will appear blurred in the image.

Photographers often want to set one of the elements of the exposure triangle to obtain a desired effect (e.g., set a fast shutter speed to obtain a sharp image of a fast-moving object, or set a small f-stop to obtain a shallow depth of focus). To obtain a proper exposure when using the desired setting, the photographer must then calculate appropriate values for the other two elements of the exposure triangle. Such calculations typically require reference to charts, for example, that show the relationships among the various values for the exposure triangle settings. Looking up the values in a chart or other external reference can be time-consuming and requires that the photographer have such chart or other reference available.

A need exists for a simple, fast, convenient way to calculate the appropriate settings for the exposure triangle components to obtain a proper photographic exposure. The present invention fulfils this and other needs.

BRIEF SUMMARY OF THE INVENTION

The invention provides, in some embodiments, a watch for calculating photographic exposures. The watches can include a watch case; a watch face disposed in the watch case, wherein the watch face is visible through an opening in the watch case. The watch face can include a plurality of markings that correspond to camera aperture numbers; and a first ISO speed reference indicator that corresponds to a first ISO speed setting. The watches can also include a rotatable bezel attached to the watch case such that the bezel is capable of moving in axial rotation about the watch face. The rotatable bezel can include an aperture reference indicator; and a first plurality of markings that correspond to camera shutter speed values, wherein the aperture numbers, shutter speed values, aperture reference indicator, and first ISO speed reference indicator are arranged such that when the rotatable bezel is rotated to place the aperture reference indicator on the rotatable bezel adjacent to a particular aperture number on the watch face, the first ISO speed reference indicator on the watch face is positioned adjacent to an indicated shutter speed value on the rotatable bezel wherein, when the indicated shutter speed value, the particular aperture number and the first ISO speed setting are set in a camera, a photograph taken by the camera will have an appropriate exposure.

The plurality of markings that correspond to camera aperture numbers can include, in some embodiments, values for one or more of full stops, ½ stops, and ⅓ stops. In particular embodiments, the plurality of markings that correspond to camera aperture numbers include two or more values selected from the group consisting of 0.95, 1, 1.4, 2, 2.8, 4, 5.6, 8, 11, 16, 22, 32, 45, and 95. These numbers correspond to F-stops of F0.95, F1, F1.4, F2, F2.8, F4, F5.6, F8, F11, F16, F22, F32, F45 and F95, respectively.

In some embodiments, the first plurality of markings that correspond to camera shutter speed values includes two or more values selected from the group consisting of 32,000, 16,000, 8000, 4000, 2000, 1000, 500, 250, 125, 60, 30, 15, 8, 4, 2, 1, 2, 4, 8, 15, 30 and 60. The first ISO speed setting, in some embodiments, is selected from the group consisting of ISO 3, 8, 12, 25, 50, 100, 200, 400, 800, 1600, 3200, 6400, 12,800, 25,600, 51,200, 102,400, 204,800, 409,600, 819,200, 1,638,400, and 3,276,800.

The watches of the invention include, in some embodiments, a rotatable bezel that further includes a second plurality of markings that correspond to camera shutter speed values; and the watch face further includes a second ISO speed reference indicator that corresponds to a second ISO speed setting. The second ISO speed reference indicator and the second plurality of camera shutter speed values are arranged such that when the rotatable bezel is rotated to place the aperture reference indicator on the rotatable bezel adjacent to a particular aperture number on the watch face, the second ISO speed reference indicator on the watch face is positioned adjacent to a second indicated shutter speed value in the second plurality of camera shutter speed values on the rotatable bezel wherein, when the second indicated shutter speed, the particular aperture number and the second ISO speed setting are set in a camera, a photograph taken by the camera will have an appropriate exposure. The second ISO speed setting is generally different than the first ISO speed setting and is selected from the group consisting of ISO 3, 8, 12, 25, 50, 100, 200, 400, 800, 1600, 3200, 6400, 12,800, 25,600, 51,200, 102,400, 204,800, 409,600, 819, 200, 1,638,400, and 3,276,800. The second plurality of markings that correspond to camera shutter speed values includes two or more values selected from the group consisting of 8000, 4000, 2000, 1000, 500, 250, 125, 60, 30, 15, 8, 4, 2, 1, 2, 4, 8, 15, 30 and 60.

In some embodiments, the invention provides a watch for calculating photographic exposures, in which the watch includes a watch case, a watch face disposed in the watch case, wherein the watch face is visible through an opening in the watch case; and a rotatable bezel attached to the watch case such that the bezel is capable of moving in axial rotation about the watch face. These embodiments can have at least two different arrangements of markings on the rotatable bezel and the watch face. In one of these arrangements, the watch face can include a plurality of markings that correspond to camera aperture numbers and at least a first ISO speed reference indicator that corresponds to a first ISO speed setting, while the rotatable bezel includes an aperture reference indicator and at least a first plurality of markings that correspond to camera shutter speed values. In an alternative arrangement, the markings of the watch face and the rotatable bezel are switched, so that the watch face includes an aperture reference indicator and at least a first plurality of markings that correspond to camera shutter speed values; and the rotatable bezel includes a plurality of markings that correspond to camera aperture numbers and at least a first ISO speed reference indicator that corresponds to a first ISO speed setting. In either arrangement, the aperture numbers, the shutter speed values, the aperture reference indicator, and the first ISO speed reference indicator are arranged such that when the rotatable bezel is rotated to place the aperture reference indicator adjacent to a particular aperture number, the first ISO speed reference indicator is adjacent to an indicated shutter speed value, wherein when the indicated shutter speed value, the particular aperture number and the first ISO speed setting are set in a camera, a photograph taken by the camera will have an appropriate exposure.

As an example, when the camera aperture numbers and the ISO speed reference indicator are on the watch face and the aperture reference indicator and the camera shutter speed values are on the rotatable bezel, and the bezel is rotated to place the aperture reference indicator on the bezel adjacent to a particular aperture number on the watch face, the ISO speed reference indicator on the watch face will be adjacent to an indicates shutter speed value on the rotatable bezel.

Similarly, as another example, when the camera aperture numbers and the ISO speed reference indicator are on the rotatable bezel and the aperture reference indicator and the camera shutter speed values are on the watch face, and the bezel is rotated to place the aperture reference indicator on the watch face adjacent to a particular aperture number on the rotatable bezel, the ISO speed reference indicator on the rotatable bezel will be adjacent to an indicates shutter speed value on the watch face.

In some embodiments, the invention provides watches that have more than one sets of markings for one or more of the camera aperture numbers, the ISO speed reference indicator, the camera shutter speed values, and the aperture reference indicator. For example, the invention provides watches in which either (a) the watch face includes a plurality of markings that correspond to camera aperture numbers, a first ISO speed reference indicator that corresponds to a first ISO speed setting; and at least a second ISO speed reference indicator that corresponds to a second ISO speed setting, and the rotatable bezel includes an aperture reference indicator and a first plurality of markings that corresponds to a first plurality of camera shutter speed values; or (b) the watch face includes an aperture reference indicator, a first plurality of markings that correspond to camera shutter speed values, and at least a second plurality of markings that correspond to a second plurality of camera shutter speed values, and the rotatable bezel includes a plurality of markings that correspond to camera aperture numbers, a first ISO speed reference indicator that corresponds to a first ISO speed setting, and at least a second ISO speed reference indicator that corresponds to a second ISO speed setting. In each of these embodiments, the markings that correspond to the aperture numbers, the shutter speed values, the aperture reference indicator, and the first ISO speed reference indicator are arranged such that when the rotatable bezel is rotated to place the aperture reference indicator adjacent to a particular aperture number, the first ISO speed reference indicator adjacent to an indicated shutter speed value, wherein when the indicated shutter speed value, the particular aperture number and the first ISO speed setting are set in a camera, a photograph taken by the camera will have an appropriate exposure. The second ISO speed reference indicator and the second plurality of markings that correspond to the second set of camera shutter speed values are arranged such that when the rotatable bezel is rotated to place the aperture reference indicator adjacent to a particular aperture number, the second ISO speed reference indicator is positioned adjacent to a second indicated shutter speed value in the second plurality of camera shutter speed values wherein, when the second indicated shutter speed, the particular aperture number and the second ISO speed setting are set in a camera, a photograph taken by the camera will have an appropriate exposure.

In some embodiments, the watches of the invention include a first set of camera shutter speed values for a first ISO speed, wherein the first set includes a first plurality of markings that correspond to camera shutter speed values for a first type of lighting conditions, and a second plurality of markings that correspond to camera shutter speed values for a second set type of lighting conditions. In these embodiments, the first set of camera shutter speed values and the second set of camera shutter speed values are typically both on the rotatable bezel, or are both on the watch face. The first plurality of camera shutter speed values and the second plurality of camera shutter speed values are arranged such that when the rotatable bezel is rotated to place the aperture reference indicator adjacent to a particular aperture number, the first ISO speed reference indicator is positioned in alignment with one indicated shutter speed value in the first plurality of camera shutter speed values and with a second indicated camera shutter speed value in the second plurality of camera shutter speed values. When the first indicated shutter speed, the particular aperture number and the first ISO speed setting are set in a camera, a photograph taken by the camera will have an appropriate exposure under the first type of lighting conditions, and when the second indicated shutter speed, the particular aperture number and the first ISO speed setting are set in a camera, a photograph taken by the camera will have an appropriate exposure under the second type of lighting conditions. In some embodiments one of the types of lighting conditions is lighting typical of a sunny day. In some embodiments, the first type or the second type of lighting conditions is lighting typical of a cloudy day.

The watches of the invention can, in some embodiments, also include a light measuring device which can measure the lighting conditions to which the measuring device is exposed. The CPU is configured to adjust one or more of the ISO speed setting, aperture number, and shutter speed based on the light measurement to provide settings that, when used to adjust settings on the camera, will result in a photograph taken by the camera having an appropriate exposure in the ambient light. In some embodiments, the ISO speed settings, aperture numbers and shutter speeds for both light-adjusted and non-adjusted readings are displayed on the watch face.

In some embodiments, the invention provides watches for calculating photographic exposures that include an electronic display on which the watch face is displayed. These watches can include a central processing unit (CPU) that is configured to execute stored instructions, a memory device that includes stored instructions that are executable by the CPU, wherein the stored instructions include display instructions to render watch face markings on the electronic display, a user interface configured to enable a user to select a set of stored instructions to be executed by the CPU; and a display interface that transmits executed display instructions from the CPU to the display wherein the display instructions include instructions to display the plurality of markings that correspond to aperture numbers and the ISO speed reference indicator on the watch face. In alternative embodiments, the aperture reference indicator and a plurality of markings that correspond to camera shutter speed values are displayed on the watch face.

The stored instructions of the electronic display watches of the invention can, in some embodiments, include one or more ISO speed settings, wherein when the user selects a particular ISO speed setting using the user interface, the display instructions cause: a) the ISO speed reference indicator for the selected ISO speed setting to be displayed on the watch face, and b) the positions of the plurality of aperture numbers on the watch face to be positioned such that when the rotatable bezel is rotated to place the aperture reference indicator on the rotatable bezel adjacent to a particular camera aperture number on the watch face, the ISO speed reference indicator is positioned adjacent to an indicated shutter speed value on the rotating bezel, wherein when the indicated shutter speed value, the particular aperture number and the first ISO speed setting are set in a camera, a photograph taken by the camera will have an appropriate exposure.

The invention also provides, in some embodiments, a watch for calculating photographic exposure that includes a watch case, a watch face enclosed in the watch case, wherein the watch face is visible through an opening in the watch case. The watch face includes an aperture reference indicator; and a plurality of markings that correspond to camera shutter speed values. The watches also can include a rotatable bezel attached to the watch case such that the bezel is capable of moving in axial rotation about the watch face. The rotatable bezel can include a plurality of markings that correspond to camera aperture numbers; and a first ISO speed reference indicator that corresponds to a first ISO speed setting. The aperture numbers, shutter speed values, aperture reference indicator, and ISO speed reference indicator are, in some embodiments, arranged such that when the rotatable bezel is rotated to place the aperture reference indicator on the watch face adjacent to a particular aperture number on the rotating bezel, the first ISO speed reference indicator on the rotating bezel is positioned adjacent to an indicated shutter speed value on the watch face wherein, when the indicated shutter speed value, the particular aperture number and the first ISO speed setting are set in a camera, a photograph taken by the camera will have an appropriate exposure.

In some embodiments, the invention provides a watch for calculating photographic exposure that includes a watch case, an electronic display enclosed in the watch case, wherein the electronic display is visible through an opening in the watch case. These watches can have a central processing unit (CPU) that is configured to execute stored instructions, a user interface configured to enable a user to select a set of stored instructions to be executed by the CPU, a display interface that transmits display instructions from the CPU to the electronic display, a memory device that includes stored instructions that are executable by the CPU, wherein the stored instructions include display instructions to render (i) watch face markings on a portion of the electronic display, and (ii) a virtual bezel on a second portion of the electronic display, wherein the virtual bezel is disposed axially about the watch face portion of the display and is capable of axial rotation about the watch face portion of the electronic display in response to user input through the user interface. In one example of this embodiment, the watch face markings include a plurality of markings that correspond to camera aperture numbers and a first ISO speed reference indicator that corresponds to a first ISO speed setting, and the virtual bezel includes an aperture reference indicator and a plurality of markings that correspond to camera shutter speed values. In another example, the watch face markings include an aperture reference indicator and a plurality of markings that correspond to camera shutter speed values; and the virtual bezel includes a first ISO speed reference indicator and a plurality of markings that correspond to camera aperture numbers. The markings that correspond to the aperture numbers, the shutter speed values, the aperture reference indicator, and the first ISO speed reference indicator are arranged such that when the virtual bezel is virtually rotated to place the aperture reference indicator adjacent to a particular aperture number, the ISO speed reference indicator is positioned adjacent to an indicated shutter speed value wherein, when the indicated shutter speed value, the particular aperture number and the first ISO speed setting are set in a camera, a photograph taken by the camera will have an appropriate exposure.

As an example, in some embodiments, the watch face markings can include a plurality of markings that correspond to camera aperture numbers; and a first ISO speed reference indicator that corresponds to a first ISO speed setting. The virtual bezel is capable of virtual axial rotation about the watch face portion of the electronic display in response to user input through the user interface, and includes an aperture reference indicator; and a plurality of markings that correspond to camera shutter speed values. The aperture numbers, shutter speed values, aperture reference indicator, and the first ISO speed reference indicator are arranged such that when the virtual bezel is rotated to place the aperture reference indicator on the virtual bezel adjacent to a particular aperture number on the watch face, the first ISO speed reference indicator on the watch face is positioned adjacent to an indicated shutter speed value on the rotatable bezel wherein, when the indicated shutter speed value, the particular aperture number and the first ISO speed setting are set in a camera, a photograph taken by the camera will have an appropriate exposure.

The invention also provides, in some embodiments, a watch for calculating photographic exposure that includes a watch case, an electronic display enclosed in the watch case, wherein the electronic display is visible through an opening in the watch case, a central processing unit (CPU) that is configured to execute stored instructions, and a memory device that includes stored instructions that are executable by the CPU, wherein the stored instructions include display instructions to render (i) watch face markings on a portion of the electronic display, and (ii) a photographic exposure calculator on a second portion of the electronic display. These watches also can include a user interface configured to enable a user to select a set of stored instructions to be executed by the CPU; and a display interface that transmits display instructions from the CPU to the electronic display. The photographic exposure calculator includes a plurality of camera aperture numbers, a plurality of ISO speed settings, a plurality of shutter speeds, and a window, wherein a user can use the user input to position: a) a particular aperture number and a particular shutter speed value in alignment with each other in the window, and the stored instructions will instruct the CPU to calculate an appropriate ISO speed for the particular aperture number and the particular shutter speed and display the ISO speed in the window in alignment with the particular aperture number and the particular shutter speed value; b) a particular ISO speed and a particular shutter speed value in alignment with each other in the window, and the stored instructions will instruct the CPU to calculate an appropriate aperture number for the particular shutter speed and the particular ISO speed and display the aperture number in the window in alignment with the particular ISO speed and the particular shutter speed value; or c) a particular aperture number and a particular ISO speed in alignment with each other in the window, and the stored instructions will instruct the CPU to calculate an appropriate shutter speed value for the particular aperture number and the particular ISO speed and display the shutter speed value in alignment with the particular ISO speed and the particular aperture number; wherein, when the shutter speed value, the particular aperture number and the first ISO speed setting are set in a camera, a photograph taken by the camera will have an appropriate exposure.

The invention also provides, in some embodiments, software applications for a watch for calculating photographic exposure. These software programs can include the instructions for any of the watches described herein.

In some embodiments, the application includes instructions that, when the instructions are stored in a memory device of a watch that includes the memory device, an electronic display, a central processing unit (CPU) that is configured to execute stored instructions, a user interface configured to enable a user to select a set of stored instructions to be executed by the CPU; and a display interface that transmits display instructions from the CPU to the electronic display, wherein execution of the instructions by the CPU causes the display interface to transmit display instructions to render watch face markings on a portion of the electronic display. In one example of this embodiment, the watch face markings include a plurality of markings that correspond to camera aperture numbers and a first ISO speed reference indicator that corresponds to a first ISO speed setting. In another example, the watch face markings include an aperture reference indicator and a plurality of markings that correspond to camera shutter speed values.

In some embodiments, execution of the instructions by the CPU causes the display interface to transmit further display instructions to render a virtual bezel on a second portion of the electronic display, wherein the virtual bezel is disposed axially about the watch face portion of the display. In one example of this embodiment, the watch face markings include a plurality of markings that correspond to camera aperture numbers and a first ISO speed reference indicator that corresponds to a first ISO speed setting, and the virtual bezel includes an aperture reference indicator and a plurality of markings that correspond to camera shutter speed values. In another example, the watch face markings include an aperture reference indicator and a plurality of markings that correspond to camera shutter speed values; and the virtual bezel includes a first ISO speed reference indicator and a plurality of markings that correspond to camera aperture numbers. The markings that correspond to the aperture numbers, the shutter speed values, the aperture reference indicator, and the first ISO speed reference indicator are arranged such that when the virtual bezel is virtually rotated to place the aperture reference indicator adjacent to a particular aperture number, the ISO speed reference indicator is positioned adjacent to an indicated shutter speed value wherein, when the indicated shutter speed value, the particular aperture number and the first ISO speed setting are set in a camera, a photograph taken by the camera will have an appropriate exposure.

As an example, in some embodiments, the electronic display includes a watch face that includes a plurality of markings that correspond to camera aperture numbers, and a first ISO speed reference indicator that corresponds to a first ISO speed setting. The virtual bezel is capable of (virtual) axial rotation about the watch face portion of the electronic display in response to user input through the user interface. The bezel includes (i) an aperture reference indicator, and (ii) a plurality of markings that correspond to camera shutter speed values. The aperture numbers, shutter speed values, aperture reference indicator, and the first ISO speed reference indicator are arranged such that when the rotatable bezel is rotated to place the aperture reference indicator on the rotatable bezel adjacent to a particular aperture number on the watch face, the first ISO speed reference indicator on the watch face is positioned adjacent to an indicated shutter speed value on the rotatable bezel wherein, when the indicated shutter speed value, the particular aperture number and the first ISO speed setting are set in a camera, a photograph taken by the camera will have an appropriate exposure.

In some embodiments, the invention provides a software application for a watch for calculating photographic exposure. These applications include instructions that, when the instructions are stored in a memory device of a watch that comprises the memory device, an electronic display, a central processing unit (CPU) that is configured to execute stored instructions, a user interface configured to enable a user to select a set of stored instructions to be executed by the CPU; and a display interface that transmits display instructions from the CPU to the electronic display; wherein execution of the instructions by the CPU causes the display interface to transmit display instructions to render (i) watch face markings on a portion of the electronic display, and (ii) a photographic exposure calculator on a second portion of the electronic display; wherein the photographic exposure calculator comprises a plurality of camera aperture numbers, a plurality of ISO speed settings, a plurality of shutter speeds, and a window, wherein a user can use the user input to position: a) a particular aperture number and a particular shutter speed value in alignment with each other in the window, and the stored instructions will instruct the CPU to calculate an appropriate ISO speed for the particular aperture number and the particular shutter speed and display the ISO speed in the window in alignment with the particular aperture number and the particular shutter speed value; b) a particular ISO speed and a particular shutter speed value in alignment with each other in the window, and the stored instructions will instruct the CPU to calculate an appropriate aperture number for the particular shutter speed and the particular ISO speed and display the aperture number in the window in alignment with the particular ISO speed and the particular shutter speed value; or c) a particular aperture number and a particular ISO speed in alignment with each other in the window, and the stored instructions will instruct the CPU to calculate an appropriate shutter speed value for the particular aperture number and the particular ISO speed and display the shutter speed value in alignment with the particular ISO speed and the particular aperture number; wherein, when the shutter speed value, the particular aperture number and the first ISO speed setting are set in a camera, a photograph taken by the camera will have an appropriate exposure.

BRIEF DESCRIPTION OF THE DRAWINGS

For exemplification purposes, and not for limitation purposes, aspects, embodiments or examples of the invention are illustrated in the figures of the accompanying drawings, in which:

FIG. 1 illustrates a top view of a rotatable bezel watch of the invention. In this embodiment, the watch includes a watch case 1 and a watch face 2 that is disposed in the watch case and is visible through an opening in the watch case. The watch also includes a rotatable bezel 3 disposed axially about the watch face. The watch face includes an ISO speed reference indicator 6 and a plurality of aperture numbers 5 arranged axially about a portion of the watch face 2. The rotatable bezel 3 includes a marking that is an aperture reference indicator 4, and a plurality of markings that correspond to camera shutter speed values 7. The watch as shown in FIG. 1 also a second ISO speed reference indicator 8 on the watch face, and a second plurality of camera shutter speed values 9. The watch as illustrated also includes a watch band 10.

FIG. 4 illustrates atop view of a "smart watch" embodiment of the watches of the invention. In these embodiments, the watch includes a watch case 1 and a watch face 2 that is disposed in the watch case and is visible through the watch case. A portion of the watch face includes a photographic exposure calculator 6, which has a first plurality of markings 4 that correspond to ISO speed values, a second plurality of markings 7 that correspond to camera shutter speeds, and a third plurality of markings 5 that correspond to camera aperture numbers. The photographic exposure calculator 6 also includes a window 8 from which the ISO speeds, aperture numbers, and shutter speeds are read. The illustrated watch also includes a watch band 10.

DETAILED DESCRIPTION OF THE INVENTION

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention.

It should be understood that, for clarity of the drawings and of the specification, some or all details about some structural components or steps that are known in the art are not shown or described if they are not necessary for the invention to be understood by one of ordinary skills in the art.

The invention provides, in some embodiments, a rotatable bezel watch that provides a fast, convenient, and readily available way by which a photographer can determine, for a desired setting for one component of the photography "exposure triangle," appropriate values for the other two components of the exposure triangle. By simply rotating the bezel to align the desired setting with values for the other components, one can read the appropriate settings for a proper exposure directly from the watch.

Figure 1:
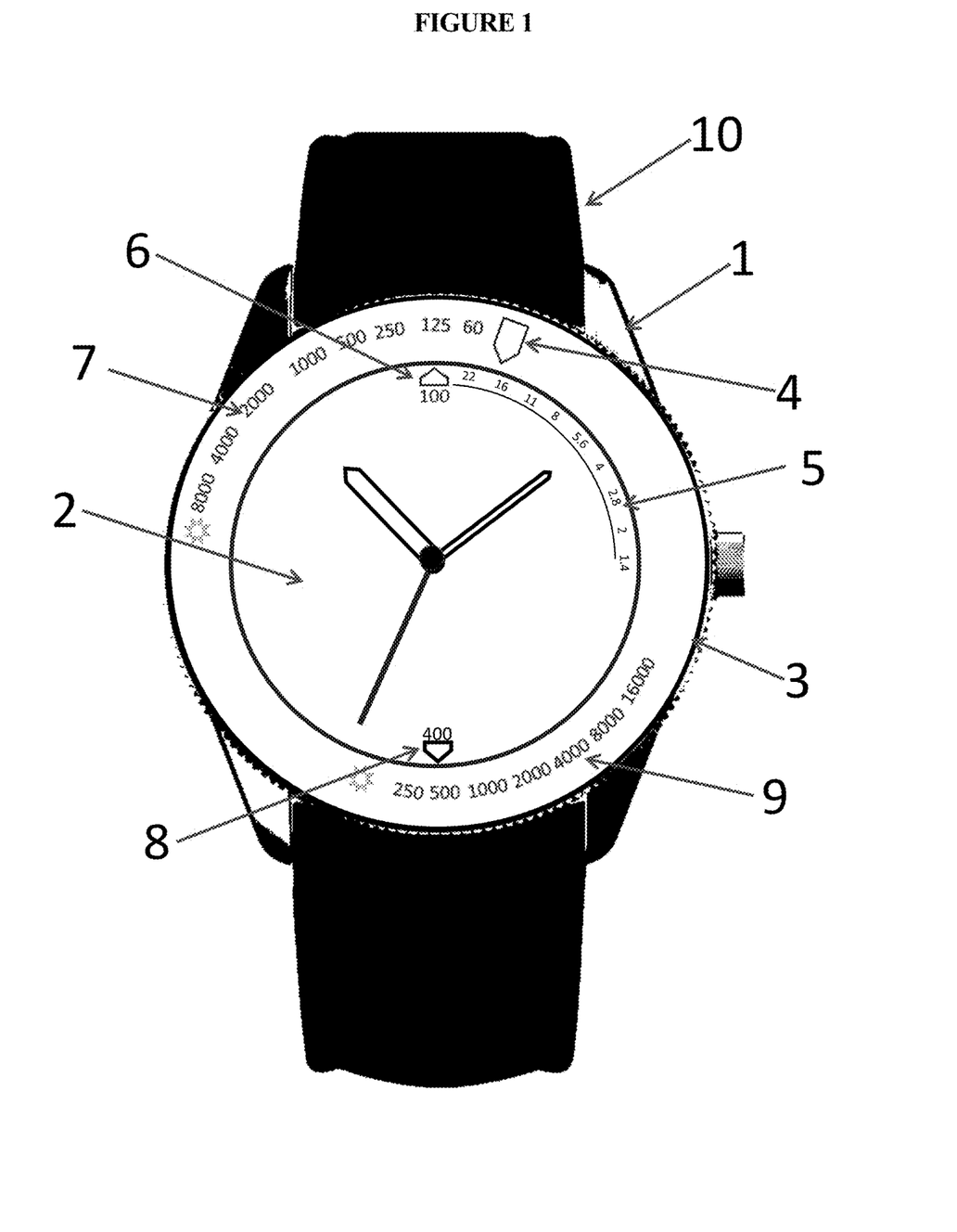

Referring to FIG. 1, the rotatable bezel watches of the invention can, in some embodiments, include a watch case 1 and a watch face 2 that is disposed in the watch case so that the watch face is visible through an opening in the watch case. The watches of the invention can also include a transparent cover for the watch face, such as a transparent lens, e.g., mineral or sapphire crystal domed lens or other materials known to those of skill in the art.

The rotatable bezel watches of the invention also include a rotatable bezel 3 that is attached to the watch case 2 in a manner that allows the bezel to rotate axially about the watch face. The bezel may be attached to the watch case using, for example, by bearings or by having a lip on the bezel that resides in a groove of the case, or any other means of movably attaching the bezel to the case (see, e.g., U.S. Pat. No. 6,744,695). The watch case can be made of, for example, metal, plastic, or any other durable material known to those of skill in the art. The rotatable bezel may be the same material as the watch case, or a different material.

The rotatable bezel watches of the invention, in some embodiments, can also include a watch band 10 that is attached to the watch case, where the watch band includes a latching clasp or other means for securing the watch to a user's wrist.

Again referring to FIG. 1, in some embodiments, the rotatable bezel watches of the invention include a watch face 2 that includes a plurality of markings 5 that correspond to camera aperture numbers and an ISO speed reference indicator 6 that corresponds to a first ISO speed setting. The term "ISO speed setting" is used interchangeably herein with terms such as film speed setting, ISO setting, ISO Speed, ASA Speed, DIN speed setting, camera speed sensor setting, and the like. The ISO speed settings that are displayed on the watch face are typically two or more values selected from the group consisting of ISO 3, 8, 12, 25, 50, 100, 200, 400, 800, 1600, 3200, 6400, 12,800, 25,600, 51,200, 102,400, 204,800, 409,600, 819,200, 1,638,400, and 3,276,800. Most typically, the ISO speed settings are selected from the group consisting of ISO 50, 100, 200, 400, 800, 1600, 3200, 6400, 12800, and 25600.

The watch face 2 also includes a plurality of markings 5 that correspond to camera aperture numbers. The aperture numbers can include values for one or more of full stops, ½ stops, and ⅓ stops. The plurality of markings will typically include two or more values selected from F95, F32, F22, F16, F11, F8, F5.6, F4, F2.8, F2, F1.4, F1, and F0.95, although other camera aperture numbers may be used in addition to, or in place of, one or more of these values. The aperture numbers refer to the size of the aperture of a lens. A lens set at F32, for example, has a smaller aperture than a lens that is set at F1.4.

The rotatable bezel 3 of these embodiments includes a marking that is an aperture reference indicator 6 and a plurality of markings that correspond to camera shutter speed values 7. The plurality of camera shutter speed values can include, for example, two or more values selected from the group consisting of 32,000, 16,000, 8000, 4000, 2000, 1000, 500, 250, 125, 60, 30, 15, 8, 4, 2, 1, 2, 4, 8, 15, 30 and 60. Typical camera shutter speed values include 8000, 4000, 2000, 1000, 500, 250 and 125 and correspond to the reciprocal of the shutter speed in seconds (e.g., a camera shutter speed value of 8000 refers to a camera shutter being open for ⅛₀₀₀ second during an exposure).

Figure 3:
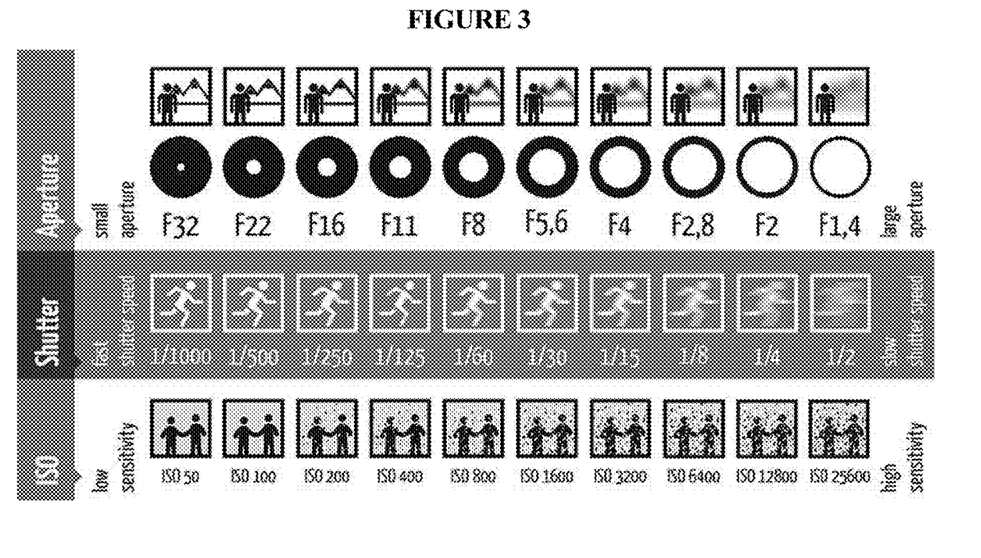
FIG. 3 provides a chart which shows examples of appropriate combinations of shutter speed, aperture numbers, and ISO speeds that will result in a proper exposure, according to the exposure triangle.

The aperture numbers, shutter speed values, aperture reference indicator, and ISO speed reference indicators are arranged on the watch face and the rotating bezel, as indicated, such that when the rotatable bezel is rotated to place the aperture reference indicator 4 on the rotatable bezel 3 adjacent to a particular aperture number on the watch face 2, the ISO speed reference indicator 6 on the watch face is aligned with an indicated shutter speed value on the rotatable bezel. When the indicated shutter speed, the particular aperture number, and the ISO speed setting are set in a camera, a photograph taken by the camera will have a proper exposure (neither overexposed nor underexposed). Appropriate values to obtain a proper exposure for various combinations of ISO speed settings, aperture numbers, and shutter speeds are known to those of ordinary skill in the art. A suitable reference from which such combinations can be obtained is *Understanding Exposure: How to Shoot Great Photographs with Any Camera* (Bryan Peterson, Amphoto Books, 4' Edition, Mar. 15, 2016), which is incorporated herein by reference. Examples of suitable shutter speed, aperture, and ISO speed values are shown in FIG. 3, which is a chart created by Daniel Peter of Fotoblog Hamburg (http://blog.hamburger-fotospots.de/genialer-spickzettel-fuer-fotografen-als-kostenloser-download/).

As an illustrative example of how to use the rotatable bezel watch of the invention, the rotatable bezel watch shown in FIG. 1 has the rotatable bezel 3 rotated so that a shutter speed value of 125 is positioned adjacent to an ISO speed reference indicator 6 on the watch face that corresponds to an ISO speed of 100. An appropriate aperture for an ISO speed of 100 and a shutter speed of ¹⁄₁₂₅ second is found in the plurality of aperture numbers 5 on the watch face adjacent to the aperture reference indicator 4 on the rotatable bezel. The appropriate aperture value for an ISO speed of 100 and a shutter speed of ¹⁄₁₂₅ second is F16. If one sets a camera to an ISO speed of 100, an aperture value of F16, and a shutter speed of ¹⁄₁₂₅ second, the resulting photograph will have a proper exposure.

In some embodiments, the watch face includes at least a second ISO speed reference indicator 8 and a second plurality of markings 9 that correspond to camera shutter speed values (referring to FIG. 1). The second ISO speed reference indicator and the second plurality of camera shutter speed values are positioned such that when the rotatable bezel 3 is rotated to place the second ISO speed reference indicator 8 is alignment with a desired shutter speed value in the second plurality of camera shutter speed values 9, the aperture reference indicator 4 on the rotatable bezel is adjacent to an appropriate aperture number in the plurality of aperture numbers 5 on the watch face. Again referring to FIG. 1, the rotatable bezel 3 in this illustration is rotated so that the aperture number reference indicator 4 is adjacent to an aperture value of F16 in the plurality of aperture numbers 5 on the watch face 2. The appropriate shutter speed for an aperture value of F16 and an ISO speed of 400 is found in the second plurality of shutter speed values 9, aligned with the ISO speed reference indicator 8 that corresponds to an ISO speed of 400. In this case, the appropriate shutter speed for a proper exposure using an ISO speed of 400 and an aperture of F16 is 500, which is ¹⁄₅₀₀ second.

Figure 2:
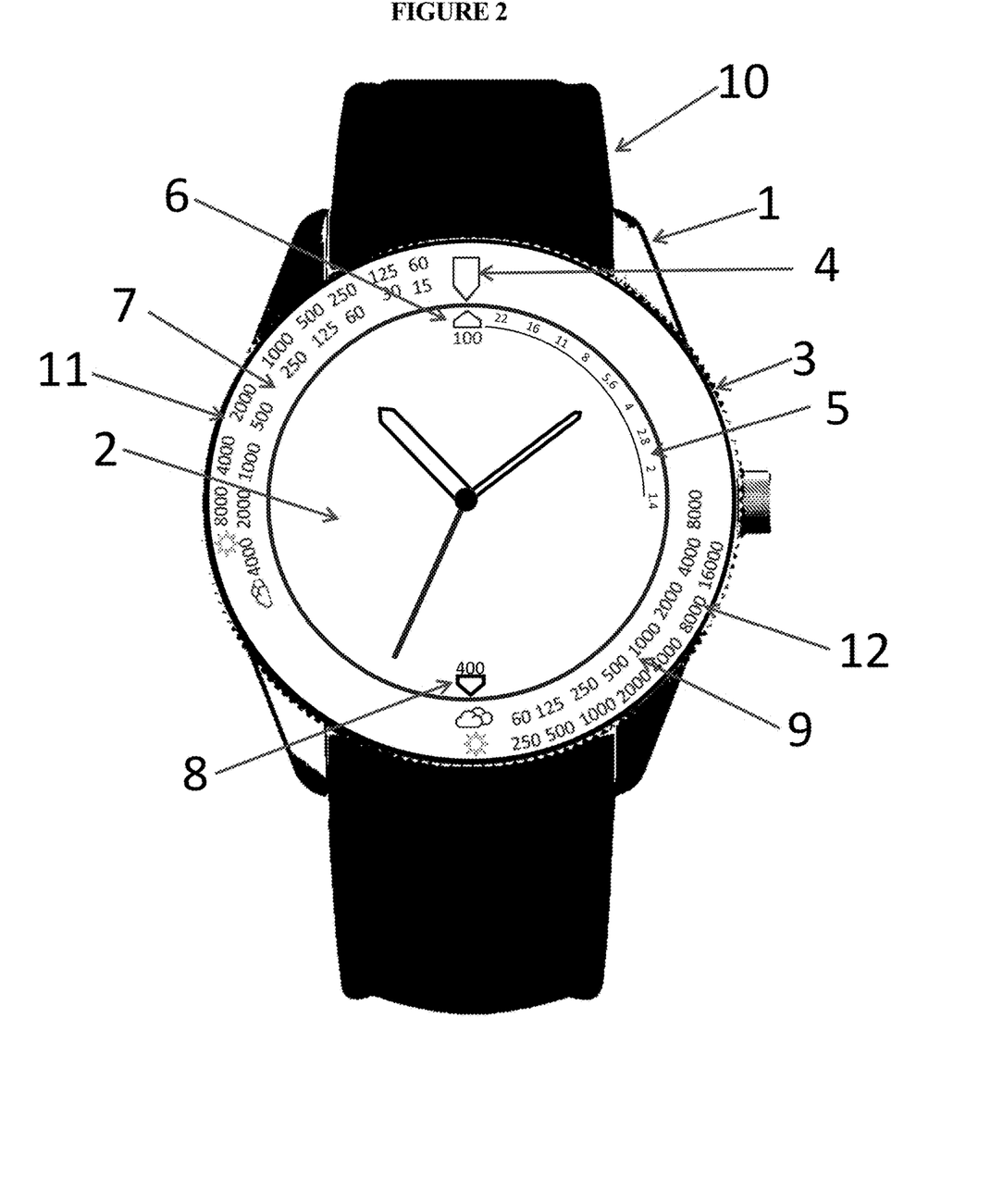
FIG. 2 illustrates a top view of a rotatable bezel watch of the invention that has two sets of shutter speed values for each ISO speed, one set for brighter conditions (e.g., a sunny day) and one set for less bright conditions (e.g., a cloudy day). In the illustrated embodiment, the rotatable bezel 3 has a first set of shutter speeds for an ISO speed of 100, which includes plurality of markings 7 that correspond to camera shutter speeds for cloudy days, and a second, overlapping plurality of markings 11 that correspond to camera shutter speeds for sunny days. The illustrated watch also has a second set of shutter speeds for an ISO speed of 400, consisting of a plurality of markings 9 that correspond to camera shutter speeds for cloudy days, and a plurality of markings 12 that correspond to camera shutter speeds for sunny days.

In some embodiments, as illustrated in FIG. 2, the watches of the invention have two sets of shutter speed values for each ISO speed, one set for brighter conditions (e.g., a sunny day) and one set for less bright conditions (e.g., a cloudy day). For example, in FIG. 2, the bezel 3 has a first set of shutter speeds for an ISO speed of 100, which includes plurality of markings 7 that correspond to camera shutter speeds for cloudy days, and a second, overlapping plurality of markings 11 that correspond to camera shutter speeds for sunny days. The illustrated watch also has a second set of shutter speeds for an ISO speed of 400. This second set of shutter speeds includes a plurality of markings 9 that correspond to camera shutter speeds for cloudy days, and a plurality of markings 12 that correspond to camera shutter speeds for sunny days. To calculate an appropriate shutter speed for a desired aperture and ISO speed, the bezel is rotated to place the aperture reference indicator 4 in alignment with the desired aperture number in the plurality of aperture numbers 5. The ISO speed reference indicator 6 is then in alignment with one shutter speed in the plurality of shutter speeds for cloudy days 7, and one shutter speed in the plurality of shutter speeds for sunny days 11. Depending on the light conditions, the photographer can choose one of those shutter speeds for the exposure. The watch illustrated in FIG. 2 also has a second set of shutter speeds for a different ISO speed than the ISO speed for the first set of shutter speeds. This second set of shutter speeds includes a first plurality of shutter speed values 9 for lower light conditions (e.g., a cloudy day) and a second plurality of shutter speed values 12 for brighter conditions (e.g., a sunny day). In the illustrated example, the photographer can choose from among two shutter speeds for ISO 100, and two shutter speeds for ISO 400, depending on lighting conditions.

The watches of the invention can, in some embodiments, also include a light measuring device which can determine the ambient light conditions by measuring the intensity of the light to which the measuring device is exposed. The CPU is configured to adjust one or more of the ISO speed setting, aperture number, and shutter speed based on the light measurement to provide settings that, when used to adjust settings on the camera, will result in a photograph taken by the camera having an appropriate exposure under the ambient lighting conditions. In some embodiments, the ISO speed settings, aperture numbers and shutter speeds for both light-adjusted and non-adjusted readings are displayed on the watch face. The light measuring device can determine one or both of the first or second types of lighting conditions, in some embodiments.

In other embodiments, the markings on the watch face and the rotatable bezel are switched. For example, the watch face includes the aperture reference indicator and the camera shutter speed values, while the rotatable bezel includes the camera aperture numbers and the ISO speed reference indicator. The positions of the respective values are such that when the rotatable bezel is rotated to place a particular aperture number on the rotatable bezel in alignment with the aperture reference indicator on the watch face, the ISO speed reference indicator on the rotatable bezel is aligned with the appropriate shutter speed value. The watch is used in exactly the same manner as the watch described above.

Smart Watch.

The invention also provides, in some embodiments, a "smart watch" in which the watch face markings are rendered on an electronic display. These embodiments can include a physical bezel that is rotatably attached to a watch case in which the electronic display is disposed, or can have a "virtual" bezel in which the bezel is displayed on a portion of the electronic display, disposed axially about the portion of the electronic display that displays the watch face markings. In other embodiments, as illustrated for example in FIG. 4, the watches of the invention have a photographic exposure calculator that does not include a rotatable bezel.

The electronic display can be enclosed in a watch case, for example, with the electronic display visible through an opening in the watch case. Suitable electronic displays are known to those of skill in the art and include, for example, light-emitting diode (LED) displays, including organic light-emitting diode (OLED) displays, active matrix organic light-emitting diodes (AMOLED) displays, liquid crystal displays (LCD), and the like. In some embodiments, the display is a touch screen display.

These "smart watch" embodiments typically include a central processing unit (CPU) that is configured to execute stored instructions, and a memory device that stores instructions that are executable by the CPU. The CPU and the memory device can be coupled by use of a bus. The CPU can be, for example, a single core processor, a multiple core processor, or any number of other configurations. The memory device can include, for example random access memory (RAM), read only memory (ROM), or any other suitable memory systems. In some embodiments, the memory device includes dynamic random access memory (DRAM).

The CPU may be linked to a display interface that is configured to transmit display instructions from the CPU to the electronic display. The display instructions typically include instructions to display watch face markings on at least a portion of the electronic display. The watch face marking instructions can include, for example, instructions to display a plurality of markings that correspond to camera aperture numbers and an ISO speed reference indicator that corresponds to a first ISO speed setting. In some embodiments, the watch will include a physical bezel that rotates axially about the display; the bezel will include an aperture reference indicator and a plurality of markings that correspond to camera shutter speed values. The aperture numbers, shutter speed values, aperture reference indicator, and ISO speed reference indicator are arranged such that when the rotatable bezel is rotated to place the aperture reference indicator on the rotatable bezel adjacent to a particular aperture number on the watch face, the ISO speed reference indicator on the watch face is positioned adjacent to an indicated shutter speed value on the rotatable bezel wherein, when the indicated shutter speed value, the particular aperture number and the first ISO speed setting are set in a camera, a photograph taken by the camera will have an appropriate exposure.

In other embodiments, the rotatable bezel is a "virtual" bezel. In these embodiments, the watch includes a memory device that has stored instructions that are executable by the CPU. The stored instructions include display instructions to render (i) watch face markings on a portion of the electronic display, and (ii) a virtual bezel on a second portion of the electronic display, wherein the virtual bezel is disposed axially about the watch face portion of the display that is displayed on a portion of the electronic display and is disposed axially about the watch face portion of the display. The watch face markings include a plurality of markings that correspond to camera aperture numbers and an ISO speed reference indicator that corresponds to a first ISO speed setting. The display instructions include instructions to display on the virtual bezel an aperture reference indicator, and a plurality of markings that correspond to camera shutter speed values. The aperture numbers, shutter speed values, aperture reference indicator, and ISO speed reference indicator are arranged such that when the virtually rotatable bezel is rotated to place the aperture reference indicator on the bezel adjacent to a particular aperture number on the watch face, the ISO speed reference indicator on the watch face is positioned adjacent to an indicated shutter speed value on the bezel. When the indicated shutter speed value, the particular aperture number and the first ISO speed setting are set in a camera, the camera will take a photograph having an appropriate exposure. Again, the invention also provides embodiments in which the markings on the virtual bezel and on the watch face are switched. For example, in some embodiments, the watch face includes a plurality of markings that correspond to camera aperture numbers and at least a first ISO speed reference indicator that corresponds to a first ISO speed setting, while the virtual bezel includes an aperture reference indicator and a plurality of markings that correspond to camera shutter speed values. As another example, the watch face can include an aperture reference indicator and a plurality of markings that correspond to camera shutter speed values, while the virtual bezel includes a plurality of markings that correspond to camera aperture numbers and at least a first ISO speed reference indicator that corresponds to a first ISO speed setting.

The smart watch can also include a user interface that is configured to enable a user to select a set of stored instructions to be executed by the CPU, or to enter information that is input to the stored instructions. In embodiments that have a virtual bezel displayed on the electronic display, for example, the user interface can cause the virtual bezel to (virtually) rotate about the watch face. The user interface can include a stem that, when turned by the user, changes the instructions to be executed by the CPU (e.g., turning the stem causes the virtual bezel to rotate). The user interface can also include one or more physical buttons on the watch, or virtual buttons that are displayed on a touch screen display. In some embodiments that include a touch screen display, the user can rotate the virtual bezel by touching the bezel and sliding a finger along the bezel. In these embodiments, the watch can include one or more touch sensors that are located along the portion of the electronic display that displays the virtual bezel. The touch sensor(s) is connected to a touch controller, which receives data from the touch sensor. This data is then processed by the CPU.

The user interface can also be configured to allow a user to select a particular ISO speed reference indicator and corresponding plurality of camera shutter speeds to be displayed on the electronic display. For example, if the photographer desires to use an ISO speed of 400, the photographer can use the user interface to select the ISO 400 reference indicator, and the watch will display the shutter speed values that correspond to an ISO speed of 400.

Figure 4:
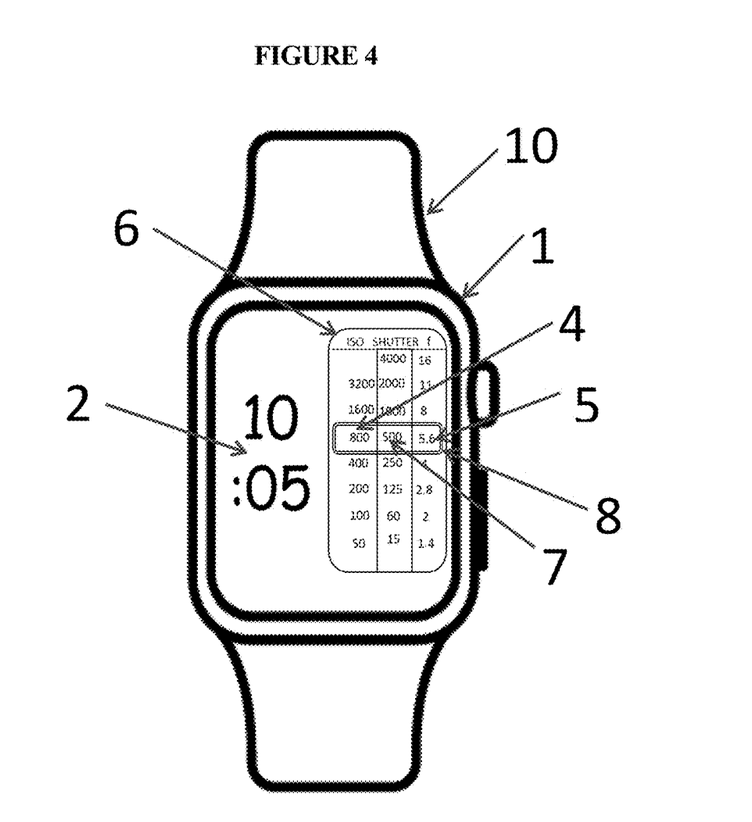

In other embodiments, the watches of the invention have a photographic exposure calculator that does not include a rotatable bezel, either physical or virtually displayed on an electronic display. One example of this embodiment is illustrated in FIG. 4, which shows a "smart watch" that has a watch case 1, and an electronic display disposed in the watch case. In these embodiments, the watch includes a memory device that has stored instructions that are executable by the CPU. The stored instructions include display instructions to render (i) watch face markings on a portion of the electronic display, and (ii) a photographic exposure calculator 6 on a second portion of the electronic display. The photographic exposure calculator 6 includes a plurality of camera aperture numbers 5, a plurality of ISO speed settings 6, and a plurality of shutter speeds 7. The relative positions of the aperture numbers, shutter speed values, and ISO speeds can be changed in response to user input. The user can set two of these values using the user input to place the desired values in alignment with each other in a window 8, and the stored instructions then calculate the appropriate value of the third value. For example, in FIG. 4, the user may have set an ISO speed of 800 and an aperture number of F5.6, and the executed stored instructions direct the electronic display to show a shutter speed of 500 (1/500 second) in the window 8. When the indicated shutter speed value, the aperture number and the ISO speed setting that are in alignment in the window 8 are set in a camera, the camera will take a photograph having an appropriate exposure.

The watches of the invention can, in some embodiments, also include a light measuring device which can measure the intensity of the light to which the measuring device is exposed. The CPU is configured to adjust one or more of the ISO speed setting, aperture number, and shutter speed based on the light measurement to provide settings that, when used to adjust settings on the camera, will result in a photograph taken by the camera having an appropriate exposure in the ambient light. In some embodiments, the ISO speed settings, aperture numbers and shutter speeds for both light-adjusted and non-adjusted readings are displayed on the watch face.

The invention also provides software applications for a smart watch for calculating appropriate photographic exposures. The applications can includes instructions that, when the instructions are stored in a memory device of a watch that comprises the memory device, an electronic display, a central processing unit (CPU) that is configured to execute stored instructions, a user interface configured to enable a user to select a set of stored instructions to be executed by the CPU; and a display interface that transmits display instructions from the CPU to the electronic display, the instructions include display instructions to render watch face markings on a portion of the electronic display. In some embodiments, the display instructions also cause the display of a virtual bezel on a second portion of the electronic display. The virtual bezel is disposed axially about the watch face portion of the display and is capable of axial (virtual) rotation about the watch face portion of the display. In some embodiments, the watch face markings include a plurality of markings that correspond to camera aperture numbers, and an ISO speed reference indicator that corresponds to a first ISO speed setting; in these embodiments, the rotatable bezel includes an aperture reference indicator and a plurality of markings that correspond to shutter speed values. In other embodiments, the watch face markings include the aperture reference indicator and a plurality of markings that correspond to shutter speed values, while the virtual bezel includes a plurality of markings that correspond to camera aperture numbers and an ISO speed reference indicator that corresponds to a first ISO speed setting. The markings that correspond to the aperture numbers, the shutter speed values, the aperture reference indicator, and the first ISO speed reference indicator are arranged such that when the virtual bezel is virtually rotated to place the aperture reference indicator adjacent to a particular aperture number, the ISO speed reference indicator is positioned adjacent to an indicated shutter speed value wherein, when the indicated shutter speed value, the particular aperture number and the first ISO speed setting are set in a camera, a photograph taken by the camera will have an appropriate exposure.

In one example, the aperture reference indicator and the plurality of markings that correspond to shutter speed values are on the rotatable bezel, and the instructions direct the electronic display to arrange the aperture numbers, aperture reference indicator, and ISO speed reference indicator such that when the rotatable bezel is rotated to place the aperture reference indicator on the rotatable bezel adjacent to a particular aperture number on the watch face, the ISO speed reference indicator on the watch face is positioned adjacent to an indicated shutter speed value on the rotatable bezel wherein, when the indicated shutter speed value, the particular aperture number and the first ISO speed setting are set in a camera, will result in an appropriate exposure for a photograph taken by the camera.

In other embodiments, the software applications of the invention provide instructions that, when stored in a memory device of a watch that comprises the memory device, an electronic display, a central processing unit (CPU) that is configured to execute stored instructions, a user interface configured to enable a user to select a set of stored instructions to be executed by the CPU; and a display interface that transmits display instructions from the CPU to the electronic display, the instructions include display instructions to render (i) watch face markings on a portion of the electronic display, and (ii) a photographic exposure calculator 6 on a second portion of the electronic display. The photographic exposure calculator 6 includes a plurality of camera aperture numbers 5, a plurality of ISO speed settings 6, and a plurality of shutter speeds 7. The relative positions of the aperture numbers, shutter speed values, and ISO speeds can be changed in response to user input. The application also includes instructions that allow the user to set two of these values using the user input to place the desired values in alignment with each other in a window 8, and the stored instructions then calculate the appropriate value of the third value. When a user uses the user input to position a particular aperture number and a particular shutter speed value in alignment with each other in the window, the stored instructions will instruct the CPU to calculate an appropriate ISO speed for the particular aperture number and the particular shutter speed and display the appropriate ISO speed in the window in alignment with the particular aperture number and the particular shutter speed value. Similarly, when a user uses the user input to position a particular ISO speed and a particular shutter speed value in alignment with each other in the window, the stored instructions will instruct the CPU to calculate an appropriate aperture number for the particular shutter speed and the particular ISO speed and display the appropriate aperture number in the window in alignment with the particular ISO speed and the particular shutter speed value. And when a user uses the user input to position a particular aperture number and a particular ISO speed in alignment with each other in the window, the stored instructions will instruct the CPU to calculate an appropriate shutter speed value for the particular aperture number and the particular ISO speed and display the appropriate shutter speed value in the window in alignment with the particular ISO speed and the particular aperture number. In each case, when the shutter speed value, the aperture number and the ISO speed setting that are in alignment with each other in the window are set in a camera, a photograph taken by the camera will have an appropriate exposure.

Use of the Watch for Calculating Photographic Exposures.

Photographers often want to prioritize a particular element of the exposure triangle to obtain a desired photographic effect. For example, if the photographer wants to prioritize having a fast shutter speed to capture a fast-moving object, the photographer must then determine suitable settings for the aperture number and ISO speed setting to obtain a good exposure for that shutter speed. The watches of the invention make it fast and easy for the photographer to determine those settings. Simply by rotating the bezel to place the ISO speed reference indicator adjacent to the desires shutter speed, the photographer can determine the appropriate aperture number simply by looking at the watch and identifying which aperture number is adjacent to the aperture reference indicator. Or, if the focal length is the photographer's primary concern for a particular photograph, the photographer rotates the bezel to place the aperture reference indicator adjacent to the desired aperture number, and can read off the shutter speed which is aligned with the ISO speed reference indicator. The settings indicated by the rotatable bezel watch are then entered into the camera, which will then take a photograph having an appropriate exposure.

If the watch includes a second ISO speed reference indicator and a second corresponding set of shutter speeds, the photographer has an additional choice for obtaining a desired photographic effect. If, for example, the watch has an ISO speed reference indicator for 400 and a second ISO speed reference indicator for 100, and the photographer wants to obtain a photograph having a deep depth of focus and a sharp image of a fast-moving object, the photographer would rotate the bezel to place the aperture reference indicator in alignment with a high aperture number (e.g., F16), and would find the appropriate shutter speed in alignment with the ISO 400 speed reference indicator, rather than the ISO 100 speed reference indicator.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples.

The invention claimed is:

1. A watch for calculating photographic exposures, the watch comprising:
 a) a watch case;
 b) a watch face disposed in the watch case, wherein the watch face is visible through an opening in the watch case; and
 c) a rotatable bezel attached to the watch case such that the bezel is capable of moving in axial rotation about the watch face;
 wherein either:
  i) the watch face comprises:
   1) a plurality of markings that correspond to camera aperture numbers; and
   2) at least a first ISO speed reference indicator that corresponds to a first ISO speed setting; and the rotatable bezel comprises:
   3) an aperture reference indicator; and
   4) at least a first plurality of markings that correspond to camera shutter speed values; or
  ii) the watch face comprises:
   1) an aperture reference indicator; and
   2) at least a first plurality of markings that correspond to a first plurality of camera shutter speed values; and the rotatable bezel comprises:
   3) a plurality of markings that correspond to camera aperture numbers; and
   4) at least a first ISO speed reference indicator that corresponds to a first ISO speed setting;
 wherein the markings that correspond to the aperture numbers, the shutter speed values, the aperture reference indicator, and the first ISO speed reference indicator are arranged such that when the rotatable bezel is rotated to place the aperture reference indicator adjacent to a particular aperture number, the first ISO speed reference indicator adjacent to an indicated shutter speed value, wherein when the indicated shutter speed value, the particular aperture number and the first ISO speed setting are set in a camera, a photograph taken by the camera will have an appropriate exposure.

2. The watch of claim 1, wherein the plurality of markings that correspond to camera aperture numbers comprises values for one or more of full stops, ½ stops, and ⅓ stops.

3. The watch of claim 1, wherein the plurality of markings that correspond to camera aperture numbers comprises two or more values selected from the group consisting of 0.95, 1, 1.4, 2, 2.8, 4, 5.6, 8, 11, 16, 22, 32, 45 and 95.

4. The watch of claim 1, wherein the first plurality of markings that correspond to camera shutter speed values comprises two or more values selected from the group consisting of 32,000, 16,000, 8000, 4000, 2000, 1000, 500, 250, 125, 60, 30, 15, 8, 4, 2, 1, 2, 4, 8, 15, 30 and 60.

5. The watch of claim 1, wherein the first ISO speed setting is selected from the group consisting of ISO 3, 8, 12, 25, 50, 100, 200, 400, 800, 1600, 3200, 6400, 12,800, 25,600, 51,200, 102,400, 204,800, 409,600, 819,200, 1,638, 400, and 3,276,800.

6. The watch of claim 1, wherein either:
   a) the watch face comprises:
      i) the plurality of markings that correspond to camera aperture numbers;
      ii) the first ISO speed reference indicator that corresponds to a first ISO speed setting; and
      iii) at least a second ISO speed reference indicator that corresponds to a second ISO speed setting; and the rotatable bezel comprises:
      iv) the aperture reference indicator;
      v) the first plurality of markings that correspond to camera shutter speed values; and
      vi) at least a second plurality of markings that correspond to a second plurality of camera shutter speed values; or
   b) the watch face comprises:
      i) the aperture reference indicator;
      ii) the first plurality of markings that correspond to camera shutter speed values; and
      iii) at least a second plurality of markings that correspond to a second plurality of camera shutter speed values; and the rotatable bezel comprises:
      iv) the plurality of markings that correspond to camera aperture numbers;
      v) the first ISO speed reference indicator that corresponds to a first ISO speed setting; and
      vi) at least a second ISO speed reference indicator that corresponds to a second ISO speed setting;
   wherein the second ISO speed reference indicator and the second plurality of markings that correspond to the second set of camera shutter speed values are arranged such that when the rotatable bezel is rotated to place the aperture reference indicator adjacent to a particular aperture number, the second ISO speed reference indicator is positioned adjacent to a second indicated shutter speed value in the second plurality of camera shutter speed values wherein, when the second indicated shutter speed, the particular aperture number and the second ISO speed setting are set in a camera, a photograph taken by the camera will have an appropriate exposure.

7. The watch of claim 6, wherein the second ISO speed setting is different than the first ISO speed setting and is selected from the group consisting of ISO 3, 8, 12, 25, 50, 100, 200, 400, 800, 1600, 3200, 6400, 12,800, 25,600, 51,200, 102,400, 204,800, 409,600, 819,200, 1,638,400, and 3,276,800.

8. The watch of claim 6, wherein the second plurality of markings that correspond to camera shutter speed values comprises two or more values selected from the group consisting of 32,000, 16,000, 8000, 4000, 2000, 1000, 500, 250, 125, 60, 30, 15, 8, 4, 2, 1, 2, 4, 8, 15, 30 and 60.

9. The watch of claim 1, wherein the watch comprises the first plurality of markings that correspond to camera shutter speed values, wherein the first plurality of markings that correspond to camera shutter speed values are appropriate for a first type of lighting conditions, and the watch further comprises a second plurality of markings that correspond to camera shutter speed values that are appropriate for a second set type of lighting conditions; wherein the first plurality of camera shutter speed values and the second plurality of camera shutter speed values are arranged such that when the rotatable bezel is rotated to place the aperture reference indicator adjacent to a particular aperture number, the first ISO speed reference indicator is positioned in alignment with one indicated shutter speed value in the first plurality of camera shutter speed values and with a second indicated camera shutter speed value in the second plurality of camera shutter speed values, wherein:
   a) when the first indicated shutter speed, the particular aperture number and the first ISO speed setting are set in a camera, a photograph taken by the camera will have an appropriate exposure under the first type of lighting conditions, and
   b) when the second indicated shutter speed, the particular aperture number and the first ISO speed setting are set in a camera, a photograph taken by the camera will have an appropriate exposure under the second type of lighting conditions.

10. The watch of claim 9, wherein the first or the second type of lighting conditions comprises lighting typical of a sunny day.

11. The watch of claim 9, wherein the first or the second type of lighting conditions comprises lighting typical of a cloudy day.

12. The watch of claim 9, wherein the watch further comprises a light measuring device that is configured to measure the intensity of the light to which the light measuring device is exposed, thereby determining one or both of the first or second types of lighting conditions.

13. The watch of claim 1, wherein the watch face comprises an electronic display.

14. The watch of claim 13, wherein the watch further comprises:
   a) a central processing unit (CPU) that is configured to execute stored instructions;
   b) a memory device that comprises stored instructions that are executable by the CPU, wherein the stored instructions comprise display instructions to render watch face markings on the electronic display, wherein the watch face markings comprise the first ISO speed reference indicator and the plurality of markings that correspond to camera aperture numbers; and
   c) a user interface configured to enable a user to select a set of stored instructions to be executed by the CPU.

15. The watch of claim 14, wherein the user interface allows the user to select a desired ISO speed setting and the display instructions cause: a) the ISO speed reference indicator for the desired ISO speed setting to be displayed on the watch face, and b) the positions of the plurality of aperture numbers on the watch face to be positioned such that when the rotatable bezel is rotated to place the aperture reference indicator on the rotatable bezel adjacent to a particular camera aperture number on the watch face, the ISO speed reference indicator is positioned adjacent to an indicated shutter speed value on the rotating bezel, wherein when the indicated shutter speed value, the particular aperture number and the first ISO speed setting are set in a camera, a photograph taken by the camera will have an appropriate exposure.

16. A watch for calculating photographic exposure, comprising:
   a) a watch case;
   b) an electronic display enclosed in the watch case, wherein the electronic display is visible through an opening in the watch case;
   c) a central processing unit (CPU) that is configured to execute stored instructions;
   d) a display interface that transmits display instructions from the CPU to the electronic display;

e) a user interface configured to enable a user to select a set of stored instructions to be executed by the CPU
f) a memory device that comprises stored instructions that are executable by the CPU, wherein the stored instructions comprise display instructions to render (i) watch face markings on a portion of the electronic display, and (ii) a virtual bezel on a second portion of the electronic display, wherein the virtual bezel is disposed axially about the watch face portion of the display and is capable of axial rotation about the watch face portion of the electronic display in response to user input through the user input through the user interface; and
g) wherein either:
  i) the watch face markings comprise a plurality of markings that correspond to camera aperture numbers and a first ISO speed reference indicator that corresponds to a first ISO speed setting; and the virtual bezel comprises an aperture reference indicator and a plurality of markings that correspond to camera shutter speed values; or
  ii) the watch face markings comprise an aperture reference indicator and a plurality of markings that correspond to camera shutter speed values; and the virtual bezel comprises a first ISO speed reference indicator and a plurality of markings that correspond to camera aperture numbers;
wherein the markings that correspond to the aperture numbers, the shutter speed values, the aperture reference indicator, and the first ISO speed reference indicator are arranged such that when the virtual bezel is virtually rotated to place the aperture reference indicator adjacent to a particular aperture number, the ISO speed reference indicator is positioned adjacent to an indicated shutter speed value wherein, when the indicated shutter speed value, the particular aperture number and the first ISO speed setting are set in a camera, a photograph taken by the camera will have an appropriate exposure.

17. A watch for calculating photographic exposure, comprising:
a) a watch case;
b) an electronic display enclosed in the watch case, wherein the electronic display is visible through an opening in the watch case;
c) a central processing unit (CPU) that is configured to execute stored instructions;
d) a memory device that comprises stored instructions that are executable by the CPU, wherein the stored instructions comprise display instructions to render (i) watch face markings on a portion of the electronic display, and (ii) a photographic exposure calculator on a second portion of the electronic display;
e) a user interface configured to enable a user to select a set of stored instructions to be executed by the CPU; and
f) a display interface that transmits display instructions from the CPU to the electronic display;
g) wherein the photographic exposure calculator comprises a plurality of camera aperture numbers, a plurality of ISO speed settings, a plurality of shutter speeds, and a window, wherein a user can use the user input to position:
  i) a particular aperture number and a particular shutter speed value in alignment with each other in the window, and the stored instructions will instruct the CPU to calculate an appropriate ISO speed for the particular aperture number and the particular shutter speed and display the ISO speed in the window in alignment with the particular aperture number and the particular shutter speed value;
  ii) a particular ISO speed and a particular shutter speed value in alignment with each other in the window, and the stored instructions will instruct the CPU to calculate an appropriate aperture number for the particular shutter speed and the particular ISO speed and display the aperture number in the window in alignment with the particular ISO speed and the particular shutter speed value; or
  iii) a particular aperture number and a particular ISO speed in alignment with each other in the window, and the stored instructions will instruct the CPU to calculate an appropriate shutter speed value for the particular aperture number and the particular ISO speed and display the shutter speed value in alignment with the particular ISO speed and the particular aperture number;
wherein, when the particular shutter speed value, the particular aperture number and the particular ISO speed setting are set in a camera, a photograph taken by the camera will have an appropriate exposure.

18. A software application for programming a watch that is useful for calculating photographic exposures, wherein the application comprises instructions that, when the instructions are stored in a memory device of a watch that comprises the memory device, an electronic display, a central processing unit (CPU) that is configured to execute stored instructions, a user interface configured to enable a user to select a set of stored instructions to be executed by the CPU; and a display interface that transmits display instructions from the CPU to the electronic display; execution of the instructions by the CPU causes the display interface to transmit display instructions to render (i) watch face markings on a portion of the electronic display, and (ii) a virtual bezel on a second portion of the electronic display, wherein the virtual bezel is disposed axially about the watch face portion of the display; wherein
a) the watch face markings comprise:
  i) a plurality of markings that correspond to camera aperture numbers; and
  ii) at least a first ISO speed reference indicator that corresponds to a first ISO speed setting; and
b) the virtual bezel is capable of virtual axial rotation about the watch face portion of the electronic display in response to user input through the user interface, wherein the virtual bezel comprises:
  i) an aperture reference indicator; and
  ii) a plurality of markings that correspond to camera shutter speed values;
wherein the aperture numbers, the shutter speed values, the aperture reference indicator, and the first ISO speed reference indicator are arranged such that when the virtual bezel is rotated to place the aperture reference indicator on the rotatable bezel adjacent to a particular aperture number on the watch face, the first ISO speed reference indicator on the watch face is positioned adjacent to an indicated shutter speed value on the virtual bezel wherein, when the indicated shutter speed value, the particular aperture number and the first ISO speed setting are set in a camera, a photograph taken by the camera will have an appropriate exposure.

* * * * *